US012808387B2

(12) United States Patent
Dybdahl et al.

(10) Patent No.: US 12,808,387 B2
(45) Date of Patent: Nov. 24, 2026

(54) VENTILATION FAN WITH ANTI-REVERSAL DEVICE

(71) Applicant: DACS A/S, Nørre Snede (DK)

(72) Inventors: Jens Dybdahl, Nørre Snede (DK); Jens Halsøe, Nørre Snede (DK)

(73) Assignee: DACS A/S, Nørre Snede (DK)

( * ) Notice: Subject to any disclaimer, the term of this patent is extended or adjusted under 35 U.S.C. 154(b) by 0 days.

(21) Appl. No.: 18/371,861

(22) Filed: Sep. 22, 2023

(65) Prior Publication Data

US 2024/0011499 A1 Jan. 11, 2024

Related U.S. Application Data

(63) Continuation of application No. PCT/EP2023/051661, filed on Jan. 24, 2023.

(30) Foreign Application Priority Data

Jan. 28, 2022 (EP) .................................... 22153935

(51) Int. Cl.
*F04D 29/32* (2006.01)
*F04D 19/00* (2006.01)
(Continued)

(52) U.S. Cl.
CPC ......... *F04D 29/329* (2013.01); *F04D 19/002* (2013.01); *F04D 25/06* (2013.01); *F04D 25/08* (2013.01); *F16D 41/12* (2013.01)

(58) Field of Classification Search
CPC ........ F04D 19/002; F04D 25/02; F04D 25/06; F04D 25/08; F04D 29/329;
(Continued)

(56) References Cited

U.S. PATENT DOCUMENTS 305,697 A * 9/1884 Loud ........................ F16D 41/12
192/46
842,587 A * 1/1907 Skogstad ................ F16D 41/12
192/46
(Continued)

FOREIGN PATENT DOCUMENTS

CN 102128220 A * 7/2011
CN 103746509 A 4/2014
(Continued)

*Primary Examiner* — Mark A Laurenzi
*Assistant Examiner* — Joseph S. Herrmann
(74) *Attorney, Agent, or Firm* — Dinsmore & Shohl LLP

(57) ABSTRACT

A ventilation fan has an electric motor driving a rotor having a hub mounted on the motor drive shaft. An anti-reversal device is concentrically mounted between the motor and rotor and has: an annular hub-plate concentrically mounted on the hub; and an annular arrangement of a first number of teeth provided on the motor and concentrically with the hub-plate. The hub-plate has a second number of latches, each having a first end where the latch is pivotably mounted inside the hub-plate, and a second end. The latch can pivot by swinging the second end in a radially outward direction if the hub is rotated in a predetermined first direction. The pivotable latch has an engagement hook to engage one of the annular arranged teeth when the latch is in a non-pivoted position for blocking rotation in a second rotational direction and clear the teeth when the latch is pivoted.

14 Claims, 3 Drawing Sheets

(51) Int. Cl.
*F04D 25/06* (2006.01)
*F04D 25/08* (2006.01)
*F16D 41/12* (2006.01)

(58) Field of Classification Search
CPC ........... F05D 2260/403; F05D 2260/85; F05D 2260/90; F16D 41/12; F16D 41/18; F16D 41/069; F16D 41/07; F16D 41/076; F16D 2041/0603; H02K 7/07; H02K 7/10; H02K 7/102; H02K 7/108
See application file for complete search history.

(56) References Cited

U.S. PATENT DOCUMENTS

| | | | | | |
|---|---|---|---|---|---|
| 2,299,920 | A * | 10/1942 | Moore | F28F 25/10 | 261/DIG. 11 |
| 2,323,353 | A * | 7/1943 | Plog | F16D 41/12 | 192/103 B |
| 4,410,072 | A * | 10/1983 | Dickinson | F16D 41/12 | 192/223.1 |
| 4,651,040 | A * | 3/1987 | Gerstner | D06F 39/085 | 310/90 |
| 5,246,094 | A * | 9/1993 | Army | F02N 15/027 | 192/104 C |
| 2001/0035322 | A1 * | 11/2001 | Reinhart | F16D 41/12 | 60/345 |
| 2006/0284500 | A1 * | 12/2006 | Han | H02K 16/02 | 310/68 E |
| 2007/0138662 | A1 * | 6/2007 | Chiu | F28D 5/02 | 261/DIG. 11 |
| 2013/0022467 | A1 * | 1/2013 | Watkins | F04D 13/022 | 416/169 R |
| 2013/0220760 | A1 * | 8/2013 | Tsao | F16D 15/00 | 192/45.1 |
| 2019/0356187 | A1 * | 11/2019 | Fröhlich | H02K 5/06 | |
| 2020/0274409 | A1 * | 8/2020 | Kawata | H02K 1/28 | |
| 2020/0332804 | A1 * | 10/2020 | Lin | F04D 29/005 | |

FOREIGN PATENT DOCUMENTS

| | | | | |
|---|---|---|---|---|
| DE | 4023258 | A1 | 2/1991 | |
| JP | S6114711 | U * | 1/1986 | |
| WO | WO-2017107051 | A1 * | 6/2017 | H02K 7/07 |

* cited by examiner

VENTILATION FAN WITH ANTI-REVERSAL DEVICE

CROSS-REFERENCE TO RELATED APPLICATIONS

This application is a continuation of International Patent Application No. PCT/EP2023/051661 filed on Jan. 24, 2023 and designating the United States of America and which claims priority to European Patent Application 22153935.6 filed on Jan. 28, 2022, the entire content of both are incorporated herein by reference in their entirety.

FIELD OF THE INVENTION

The present invention relates to a ventilation fan with an anti-reversal device and an anti-reversal device for a ventilation fan.

BACKGROUND OF THE INVENTION

In some applications, there is a need to restrain the equipment from rotating in the reverse direction. This is typically known as an anti-reverse rotation device or simply an anti-reversal device. A clutch or brake can be used for this purpose, but these solutions might be too complicated or expensive for the system and compromise the performance of the system.

As an example, in CN103746509A discloses an anti-reverse-rotation device of a motor. The anti-reverse-rotation device of the motor comprises a rotating disk, a fixing piece and a stop pin.

Anti-reverse-rotation devices for a clutch or a drum or the like are known in the art for various purposes. In DE 4023258 A1 a reverse rotation blocking device is known where the latches engaging indentations are spring-loaded so that the axis of rotation can be vertical. In JP S61 14711U a latch will engage one of the hook-like teeth on the hub disc. Common for all these solutions is that the latches will be in contact with the toothed disc when rotating in the correct direction. Thus, these known latch arrangements function as a clutch, and would cause friction and wear if rotated in the reverse direction. This is not considered an acceptable solution in relation to ventilation fans.

In relation to an electric ventilation fan, backwards spin may occur due to reverse wind-flow when the fan is not in operation. This is undesired as the backwards spinning fan will generate an electrical effect when the electric motor of the fan is a permanent magnet electric motor. To prevent this, the rotation can be stopped in various manners. However, the mechanical and electrical forces required to brake, align and restart a fan which is spinning backwards may be substantial and can lead to both electrical and mechanical failures. Electric braking using resistors can be used to brake the fan by shortcutting the windings on the electric motor to stop the motor. This however involves a risk of damaging the electric control.

Accordingly, it is an object for the present invention to provide an anti-reversal device for a ventilation fan, which can prevent unwanted reverse spinning when the fan is not in use, where the risk of damaging the electric motor and its control is eliminated.

SUMMARY OF THE INVENTION

This object is achieved by the provision of a ventilation fan comprising an electric motor driving a ventilation fan having a hub and mounted on the drive shaft of the motor, and wherein an anti-reversal device is concentrically mounted between said motor and said fan, said anti-reversal device comprising: an annular hub-plate concentrically mounted on the hub of the fan, an annular arrangement of a first number of teeth provided on the motor and concentrically with the hub-plate; wherein said hub-plate comprises a second number of latches, each of said latches having a first end where said latch is pivotably mounted inside said hub-plate, and a second end, so that the latch can pivot by swinging the second end in a radially outward direction if the hub is rotated in a predetermined first direction, wherein the pivotable latch is provided with an engagement hook adapted to engage one of the annular set teeth when the latch is in a non-pivoted position for blocking rotation in a second rotational direction and clear the annular teeth when the latch is in a pivoted position.

This anti-reversing device in a ventilation fan according to the invention is advantageous as this solution can prevent a standby ventilation fan from reverse rotation when the fan is not in operation. The device according to the invention also helps eliminate any damaging and costly “reverse wind-milling”. Under reverse rotation, the eccentric mass of the second end of at least one of the latches positions the latch in the counter-rotating hub-plate and the engagement hook in the vicinity of the first pivot end of the latch will engage the teeth of the annular set of teeth and thereby preventing the mechanical equipment from operating in reverse direction.

It is found particularly advantageous when the fan is driven by a permanent magnet motor, which is gradually becoming a standard on high efficiency ventilation fans, as the problem of reverse rotation is even more pronounced.

The force generated by the wind acting on the blade creates rotation of the motor shaft and this will generate currents in the permanent magnet motor which have to be absorbed by the electrical setup. The generated currents can easily be of a magnitude too big for the capacitors and/or brake resistors to handle, and the result is damage to the electronics in the motor controllers.

Preferably, the latches are all identical. Furthermore, it is preferred that the second end of the latches are provided with a mass of material, so that a majority of the total mass of the latch is at the section of the second end. Hereby, the centrifugal forces acting on the latch are increased when the rotation of the hub-plate in the allowed first direction causes the latch to pivot.

In some preferred embodiments, the latch are curved between the first and second end, preferably with a curvature matching the circumferential position in the hub-plate. This allows for a compact design of the anti-reversal device. Moreover, the latch may be formed in one piece with uniform thickness in the axial direction of the ventilation fan, so that the design is compact and the latch can be produced by stamping or cutting the latch from a plate.

Preferably, the latches are pivotably mounted for pivoting about an axis parallel to the axis of rotation of the hub-plate. Hereby, it is ensured that the latches pivot in the radial plane.

Preferably, the plurality of pivotable latches, such as four latches, are provided equally angularly spaced on said hub-plate. Hereby, it is ensured that when the fan is standing still, there is always a latch which due to gravity will engage the one of the teeth.

In an embodiment, the hub-plate is provided with a plurality of inner volumes such that the pivotable latches are accommodated in each their inner volume and wherein said at least one latch can pivot. This allows for a compact hub-plate design. Moreover, it is found advantageous that the inner volume comprises a mounting tab for pivotably mounting of each of the latches, said one or more mounting tabs being parallel to the rotation axis.

In this disclosure, it is appreciated that the latches are pivotably mounted and are exclusively pivotable due to gravity or rotation of the hub plate. This allows for a simple mechanism as no spring-loaded latches or the like are required.

It is found advantageous that the annular arrangement of the first number of teeth, such as nine teeth, provided on the motor, comprises an open ring of distinct teeth, i.e. clearly separate teeth. The open ring of teeth prevents that dirt is collected, which can jeopardize the functioning of the anti-reversal device.

Advantageously, the first number (N1) of teeth is higher than the second number (N2) of latches, and that N1/N2 is a non-integer number, for instance N1 is nine and N2 is four. Hereby, it is ensured that there is no "dead point" where the latches are all in an adverse position relative to the teeth.

Preferably, the device is adapted for use on an axial flow fan with a predominantly horizontally mounted motor, and more preferably, the ventilation fan is an axial flow fan.

The ventilation fan is driven by an electric motor, for instance a permanent magnet electric motor. More preferably, the fan is provided with a predominantly horizontally mounted motor. For these types of ventilation fans it is found that the anti-reversal device according to the invention is particularly advantageous in overcoming the problems associated with reverse rotation of the rotor fan.

In summary, by providing the anti-reversal device according to the invention on a ventilation fan, backwards spinning on an electric fan is prevented due to reverse wind-flow when the fan is not operating. This is advantageous as the mechanical and electrical forces otherwise required to brake, align and restart a ventilation fan which is spinning backwards are substantial and can lead to both electrical and mechanical failures. This is prevented by the present invention.

BRIEF DESCRIPTION OF THE DRAWINGS

In the following the invention is described in more detail with reference to the embodiments shown in the accompanying drawings, in which.

DETAILED DESCRIPTION OF THE INVENTION

Figure 1:
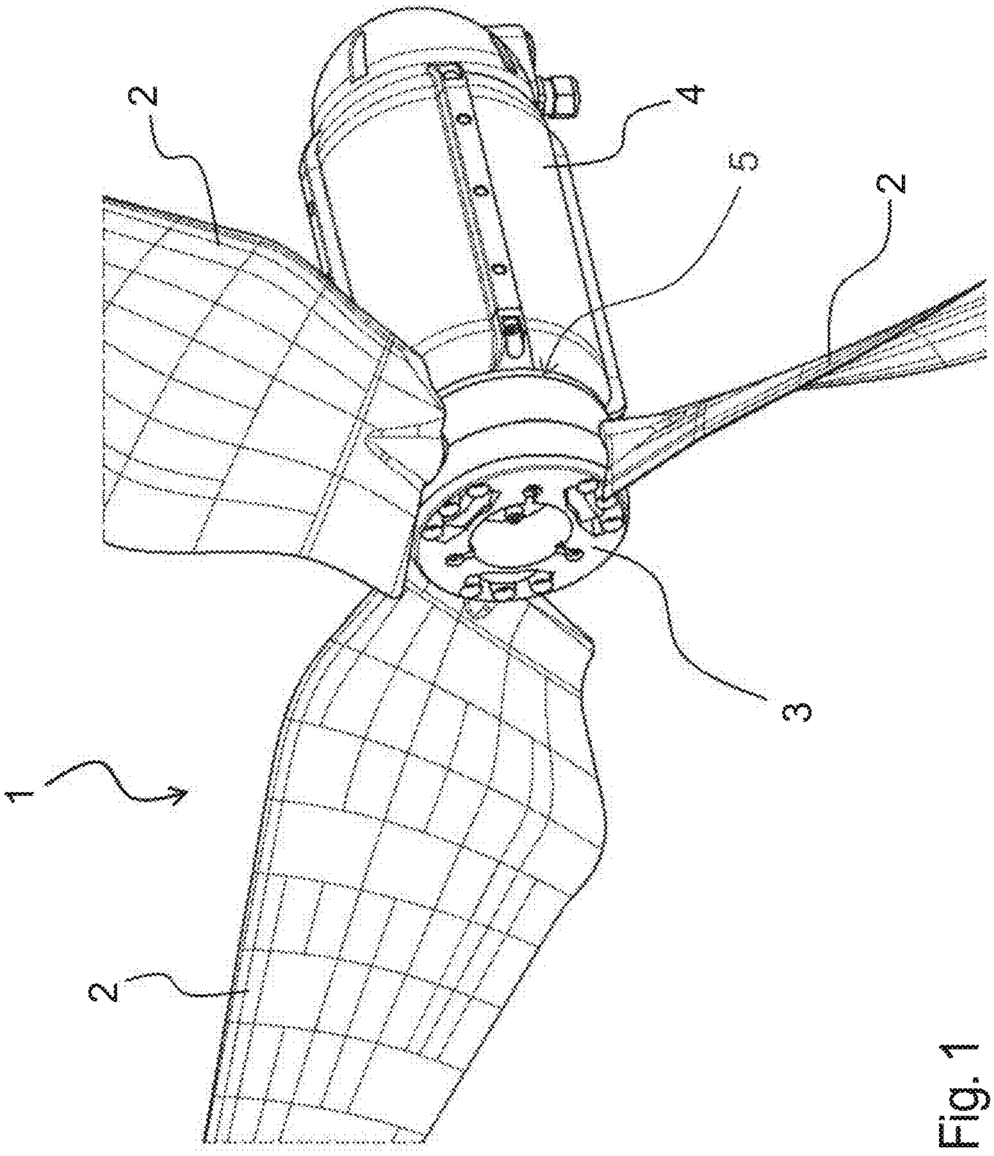
FIG. 1 is a perspective view of a ventilation fan according to an embodiment of the invention.

In FIG. 1 there is shown a ventilation fan having a rotor 1 comprising a number of blades 2 that are mounted to a hub 3. The rotor 1, i.e. the blades 2 and the hub 3 are axially mounted to an electric motor 4 and thereby rotated for generating an axial air flow.

Figure 2:
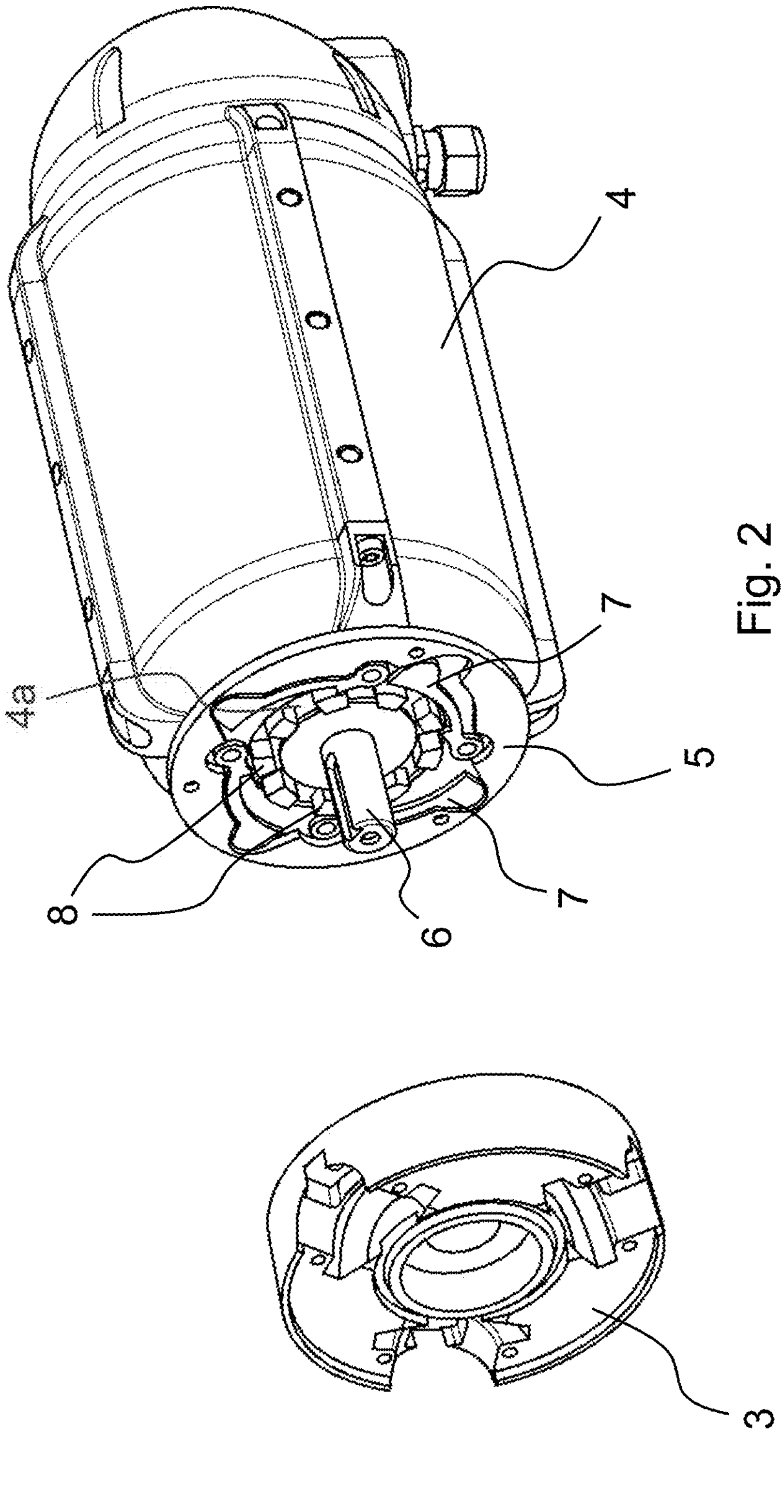
FIG. 2 is a perspective, exploded view of a ventilation fan motor with a partly disassembled anti-reversal device according to an embodiment of the invention.
Figure 3:
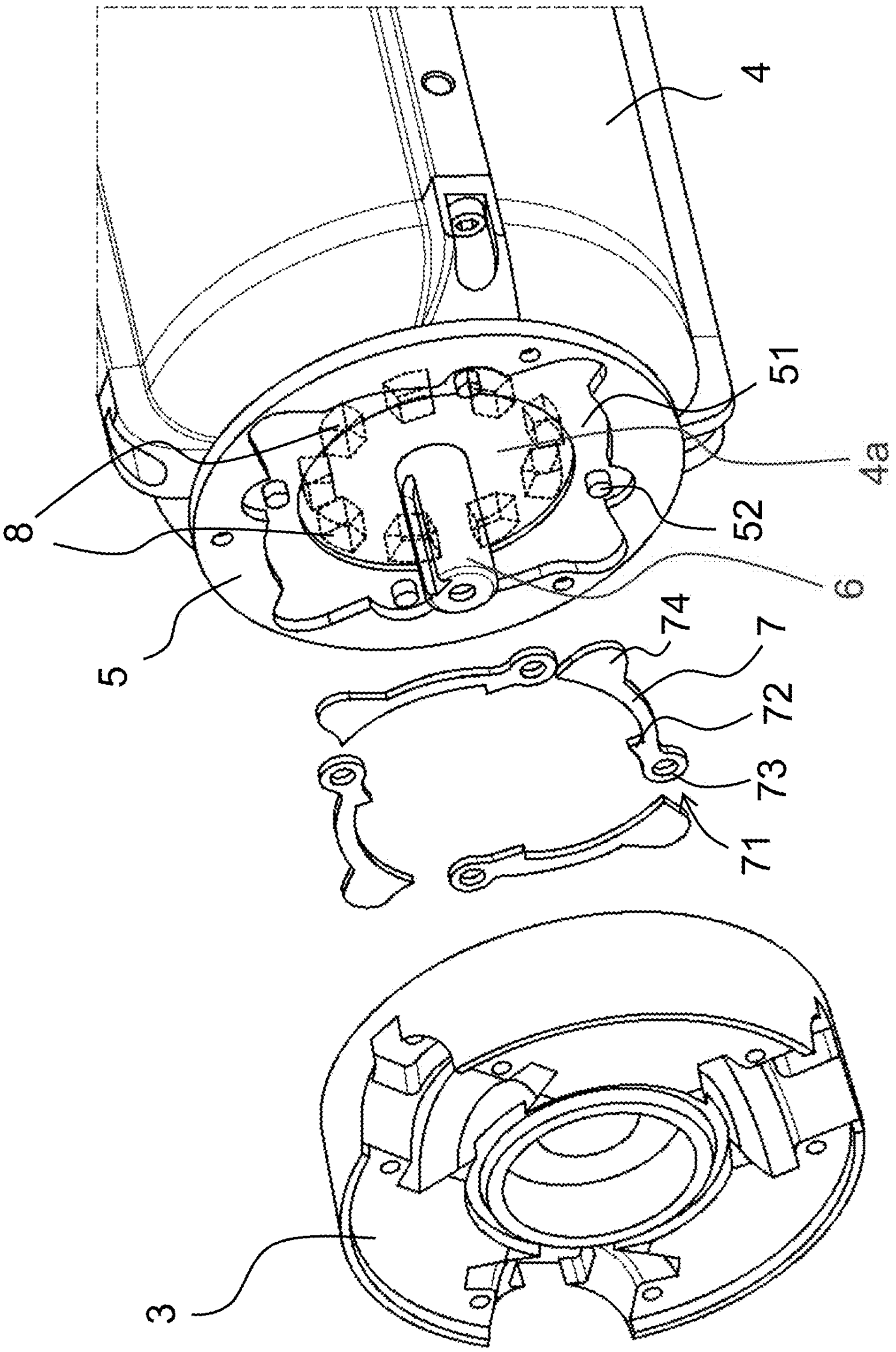
FIG. 3 is a close-up perspective view of the anti-reversal device of FIG. 2.

As shown in FIGS. 2 and 3, an anti-reversal unit is concentrically mounted between the hub 3 and the motor 4. The anti-reversal unit comprises a hub-plate 5 is mounted on the drive shaft 6 of the motor 4 concentrically mounted with the hub 3. The hub-plate 5 comprises four latches 7 mounted on a pin 52 each, in an internal volume 51 inside the hub-plate 5. The hub-plate 5 is then concentrically mounted on the main hub 3 of the ventilation fan. An annular arrangement of teeth 8 are provided on the stationary motor housing **4*a* of the motor 4 of the fan concentrically with the hub-plate 5. The latches 7 in the hub-plate 5 are free to rotate on the pins 52 but are limited in positions by the shape of the volume 51 of the hub-plate 5 and the ring of teeth 8 on the motor 4 that the hub assembly, i.e. the hub 3 and the hub-plate 5, is mounted on. As shown in FIG. 2, the ring of teeth 8 comprises nine teeth 8 equally spaced apart in the ring-shape. The ring of teeth 8** is an open ring of distinct teeth, i.e. clearly separate teeth, so no dust or dirt collects there during operation.

These latches 7 and teeth 8 only allow for rotation in one direction. Rotation in the opposite direction causes the latches 7 and teeth 8 to engage and stop the motion. In the embodiment shown in the figures, there are four latches 7 equally angularly spaced around the central axis, which means that there are always two latches ready to engage in resting position due to gravity. Thus, in the ventilation fan in this disclosure, the latches are pivotably mounted and are exclusively pivotable due to gravity or rotation of the hub plate. The anti-reversal device is thereby particularly suited for use on predominantly horizontally mounted motors as it relies on gravity to work properly.

In preferred embodiments of the anti-reversal unit of this disclosure, the first number (N1) of teeth is higher than the second number (N2) of latches, and that N1/N2 is a non-integer number. For instance as shown in the figures: N1=9 and N2=4, and N1/N2=2.25. This ensures that no "dead point" is present where all latches engage the teeth in the same manner.

When rotation happens slowly in the correct direction the latches 7 slide over the teeth 8 on the motor. At higher speeds the latches 7 are forced outwards, whereby they are freed from the teeth 8 but held in place by the outer perimeter of the inner volume 51 of the hub-plate 5 so that the latches 7 will be ready to engage again once the rotation stops. This arrangement is advantageous as it ensures that at any speed above idling the anti-reversal unit is 100% loss free.

As shown in FIGS. 2 and 3, the latches 7 are formed with a first end 71 where the latch 7 is provided with a mounting hole 73 and whereby the latch 7 is pivotably mounted to the pin 52 inside the hub-plate 5. The latches 7 further comprises a second end 74, so that the latch 7 can pivot by swinging the second end 74 in a radially outward direction if the hub 3 is rotated in the correct direction. As can be seen in the figures, the latches 7 are formed with a curvature generally matching the circular curvature of the radial position inside the hub-plate 5. The second end 74 of the latches 7 are provided with a mass of material to enhance the outward pivoting movement when the hub is spun in the correct direction.

As also shown in the figures, at the first end 71, the pivotable latches 7 are provided with an engagement hook 72 adapted to engage the annular set of teeth 8 when the latch 7 is in a non-pivoted position and thereby blocking a reverse rotation in a second rotational direction and clear the annular teeth 8 when the latch 7 is in a pivoted position.

In general, when directional terms like "horizontal" and "vertical" or similar directional references are used in the present disclosure, these terms are meant to be understood as relative terms e.g. where the term "vertical" refers to a direction essentially perpendicular to the substrate surface, and "horizontal" refers to a direction essentially parallel to the substrate. In this disclosure, the term "motor" may refer to any kind of drive means.

Above, the invention is described with reference to some currently preferred embodiments. However, by the invention it is realised that other embodiments and variants may be provided without departing from the scope of the invention as defined in the accompanying claims.

The invention claimed is:

1. A ventilation fan comprising:

an electric motor driving a rotor;

the rotor having a hub mounted on a drive shaft of the electric motor;

a plurality of blades mounted to the hub; and an anti-reversal device concentrically mounted between the motor and the rotor, the anti-reversal device comprising:

an annular hub-plate concentrically mounted on the hub; and an annular arrangement of a first number of a plurality of teeth provided on a stationary part of the motor and concentric with the hub-plate;

wherein the hub-plate comprises a second number of a plurality of pivoting latches equally angularly spaced on the hub-plate, each latch of the plurality of pivoting latches having:

a first end having a mounting hole whereby said first end of the latch is pivotably mounted on a pin inside the hub-plate so that the latch is pivotably mounted for pivoting about an axis parallel to an axis of rotation of the hub-plate; and a second end, wherein the latch is pivotable about the first end of the latch by swinging the second end in a radially outward direction and does not engage the annular arrangement of the first number of the plurality of teeth if the hub is rotated in a predetermined first rotational direction such that the rotor, and thereby the hub and the plurality of blades, are free to rotate; and an engagement hook provided at the first end of each latch and adapted to engage one of the annular arrangement of the first number of the plurality of teeth when the latch is in a non-pivoted position for blocking rotation of the rotor in a second rotational direction, which is opposite the first rotational direction, such that the hub, and thereby the plurality of blades, are prevented from rotating, and wherein the hub-plate defines a plurality of inner volumes such that the second number of the plurality of pivoting latches are accommodated in the plurality of inner volumes.

2. The ventilation fan according to claim 1, wherein the second end of each latch comprises a mass of material.

3. The ventilation fan according to claim 1, wherein each of the plurality of pivoting latches is curved between the first end and the second end.

4. The ventilation fan according to claim 3, wherein a curvature of each of the plurality of pivoting latches matches a circumferential position in the hub-plate.

5. The ventilation fan according to claim 1, wherein each of the plurality of pivoting latches has a one piece form with uniform thickness in an axial direction of the ventilation fan.

6. The ventilation fan according to claim 1, wherein each inner volume comprises the pin for pivotably mounting a corresponding one of the plurality of pivoting latches.

7. The ventilation fan according to claim 1, wherein the plurality of pivoting latches are exclusively pivotable due to gravity or rotation of the hub-plate.

8. The ventilation fan according to claim 1, wherein the first number of teeth provided in the annular arrangement is nine and the nine teeth form an open ring of separate teeth.

9. The ventilation fan according to claim 1, wherein N1 is the first number of teeth and N2 is the second number of latches, N1 is higher than N2, and N1/N2 is a non-integer number.

10. The ventilation fan according to claim 1, wherein the ventilation fan is an axial flow fan.

11. The ventilation fan according to claim 1, wherein the electric motor is a permanent magnet electric motor.

12. The ventilation fan according to claim 1, wherein the motor of the fan is mounted predominantly horizontally.

13. An anti-reversal device for a ventilation fan comprising an electric motor driving a rotor, the rotor having a hub, the hub having a plurality of blades mounted thereto, and mounted on a drive shaft of the motor, and wherein the anti-reversal device is concentrically mounted between the motor and the rotor, the anti-reversal device comprising:

an annular hub-plate concentrically mounted on the hub;

an annular arrangement of a first number of a plurality of teeth provided on a stationary part of the motor and concentric with the hub-plate;

wherein the hub-plate comprises a second number of a plurality of pivoting latches equally angularly spaced on the hub-plate, each latch of the plurality of pivoting latches having:

a first end having a mounting hole whereby said first end of the latch is pivotably mounted on a pin inside the hub-plate so that the latch is pivotably mounted for pivoting about an axis parallel to an axis of rotation of the hub-plate; and a second end, wherein the latch is pivotable about the first end of the latch by swinging the second end in a radially outward direction and does not engage the annular arrangement of the first number of the plurality of teeth if the hub is rotated in a predetermined first rotational direction such that the rotor, and thereby the hub and the plurality of blades, are free to rotate; and an engagement hook provided at the first end of each latch and adapted to engage one of the annular arrangement of the first number of the plurality of teeth when the latch is in a non-pivoted position for blocking rotation of the rotor in a second rotational direction, which is opposite the first rotational direction, such that the hub, and thereby the plurality of blades, are prevented from rotating, wherein the hub-plate defines a plurality of inner volumes such that the second number of plurality of pivoting latches are accommodated in the plurality of inner volumes.

14. The anti-reversal device according claim 13, wherein the second number of latches are provided in an annular concentric configuration, wherein N1 is the first number of teeth and N2 is the second number of latches, N1 is higher than N2, and N1/N2 is a non-integer number.

* * * * *